US012367707B2

(12) United States Patent
Deng et al.

(10) Patent No.: US 12,367,707 B2
(45) Date of Patent: Jul. 22, 2025

(54) METHOD OF TRAINING AN IMAGE CLASSIFICATION MODEL

(71) Applicant: Huawei Technologies Co., Ltd., Shenzhen (CN)

(72) Inventors: Jiankang Deng, London (GB); Stefanos Zafeiriou, London (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 17/800,481

(22) PCT Filed: Feb. 8, 2021

(86) PCT No.: PCT/CN2021/076105
§ 371 (c)(1),
(2) Date: Aug. 17, 2022

(87) PCT Pub. No.: WO2021/164625
PCT Pub. Date: Aug. 26, 2021

(65) Prior Publication Data
US 2023/0085401 A1 Mar. 16, 2023

(30) Foreign Application Priority Data
Feb. 17, 2020 (GB) ...................... 2002157

(51) Int. Cl.
*G06V 40/16* (2022.01)
*G06N 3/08* (2023.01)
(Continued)

(52) U.S. Cl.
CPC ............. *G06V 40/172* (2022.01); *G06N 3/08* (2013.01); *G06V 10/761* (2022.01);
(Continued)

(58) Field of Classification Search
CPC ............... G06F 18/214; G06F 18/2193; G06F 18/24143; G06N 20/00; G06N 3/045;
(Continued)

(56) References Cited

U.S. PATENT DOCUMENTS

2018/0165809 A1* 6/2018 Stanitsas .................. G06T 5/40
2018/0365565 A1* 12/2018 Panciatici ............... G06F 16/51
(Continued)

FOREIGN PATENT DOCUMENTS

CN 107194464 A 9/2017
CN 108062574 A 5/2018
(Continued)

OTHER PUBLICATIONS

Tao Chen et al., "SS-HCNN: Semi-Supervised Hierarchical Convolutional Neural Network for Image Classification," Jan. 30, 2019, IEEE Transactions on Image Processing, vol. 28, No. 5, May 2019, pp. 2389-2396.*

(Continued)

*Primary Examiner* — Omar S Ismail
(74) *Attorney, Agent, or Firm* — Leydig, Voit & Mayer, Ltd.

(57) ABSTRACT

A method of training a neural network for classifying an image into one of a plurality of classes, the method comprising: extracting, from the neural network, a plurality of subclass center vectors for each class; inputting an image into the neural network, wherein the image is associated with a predetermined class; generating, using the neural network, an embedding vector corresponding to the input image; determining a similarity score between the embedding vector and each of the plurality of subclass center vectors; updating parameters of the neural network in dependence on a plurality of the similarity scores using an objective function; extracting a plurality of updated param-
(Continued)

eters from the neural network; and updating each subclass center vector in dependence on the extracted updated parameters.

20 Claims, 9 Drawing Sheets

(51) Int. Cl.
   *G06V 10/74*      (2022.01)
   *G06V 10/764*     (2022.01)
   *G06V 10/82*      (2022.01)
   *G06V 30/10*      (2022.01)
   *G06V 30/18*      (2022.01)
(52) U.S. Cl.
   CPC ............ *G06V 10/764* (2022.01); *G06V 10/82* (2022.01); *G06V 30/18057* (2022.01); *G06V 30/18105* (2022.01); *G06V 30/10* (2022.01)
(58) Field of Classification Search
   CPC .......... G06N 3/048; G06N 3/08; G06N 3/082; G06N 3/084; G06V 10/761; G06V 10/764; G06V 10/82; G06V 2201/03; G06V 30/10; G06V 30/18057; G06V 30/18105; G06V 40/172
   See application file for complete search history.

(56) References Cited

U.S. PATENT DOCUMENTS

| | | | |
|---|---|---|---|
| 2019/0114544 | A1 | 4/2019 | Sundaram et al. |
| 2019/0220699 | A1* | 7/2019 | Gao ................. G06V 10/7715 |
| 2019/0220700 | A1* | 7/2019 | Gao ...................... G06N 3/08 |
| 2019/0348062 | A1* | 11/2019 | Gao ...................... G10L 25/24 |
| 2020/0210814 | A1* | 7/2020 | Mehr .................. G06N 3/088 |
| 2020/0226748 | A1* | 7/2020 | Kaufman ............ G06V 10/809 |
| 2020/0265304 | A1* | 8/2020 | Nagaraj Chandrashekar .............. G06N 20/00 |
| 2021/0224977 | A1* | 7/2021 | Jia ........................ G06F 18/24 |
| 2022/0005332 | A1* | 1/2022 | Metzler .................. G06N 3/02 |

FOREIGN PATENT DOCUMENTS

| | | |
|---|---|---|
| CN | 109753589 A | 5/2019 |
| CN | 110147882 A | 8/2019 |
| CN | 110782044 A | 2/2020 |
| WO | 2019197022 A1 | 10/2019 |

OTHER PUBLICATIONS

Yunchao Wei et al., "HCP: A Flexible CNN Framework for Multi-Label Image Classification," Aug. 11, 2016, IEEE Transactions on Pattern Analysis and Machine Intelligence, vol. 38, No. 9, Sep. 2016, pp. 1901-1905.*
Jiankang Deng et al., "ArcFace: Additive Angular Margin Loss for Deep Face Recognition ," Jun. 2019, Proceedings of the IEEE/CVF Conference on Computer Vision and Pattern Recognition (CVPR), 2019, pp. 4690-4696.*
Huan Wan et al., "Separability-Oriented Subclass Discriminant Analysis," Jan. 5, 2018, IEEE Transactions on Pattern Analysis and Machine Intelligence, vol. 40, No. 2, Feb. 2018, pp. 409-420.*
Jiankang Deng et al., "Sub-center ArcFace: Boosting Face Recognition by Large-Scale Noisy Web Faces," Nov. 27, 2020, Computer Vision—ECCV 2020. ECCV 2020. Lecture Notes in Computer Science(), vol. 12356. Springer, Cham. https://doi.org/10.1007/978-3-030-58621-8_43, pp. 741-754.*
Ying-Nong Chen et al., "Face Recognition Using Nearest Feature Space Embedding," Nov. 9, 2010, IEEE Transactions on Pattern Analysis and Machine Intelligence, vol. 33, No. 6, Jun. 2011, pp. 1073-1084.*
Muhammad Imran Razzak et al., "Face Recognition using Layered Linear Discriminant Analysis and Small Subspace," Sep. 16, 2010,2010 10th IEEE International Conference on Computer and Information Technology, pp. 1-3.*
Björn Barz et al., "Hierarchy-based Image Embeddings for Semantic Image Retrieval," Mar. 7, 2019,2019 IEEE Winter Conference on Applications of Computer Vision, pp. 638-645.*
Tianqi Chen et al., "MXNet: A Flexible and Efficient Machine Learning Library for Heterogeneous Distributed Systems," Dec. 3, 2015, arXiv:1512.01274v1 [cs. DC] Dec. 3, 2015, pp. 1-4.*
Guiguang Ding et al., "DECODE: Deep Confidence Network for Robust Image Classification," Jun. 13, 2019, IEEE Transactions on Image Processing, vol. 28, No. 8, Aug. 2019, pp. 3752-3758.*
Wei Hu et al., "Noise-Tolerant Paradigm for Training Face Recognition CNNs," Jun. 2019, Proceedings of the IEEE/CVF Conference on Computer Vision and Pattern Recognition (CVPR), 2019, pp. 11887-11893.*
Deng et al., "ArcFace: Additive Angular Margin Loss for Deep Face Recognition," 2019 IEEE/CVF Conference on Computer Vision and Pattern Recognition (CVPR), IEEE, pp. 4685-4694, Institute of Electrical and Electronics Engineers, New York, New York (Published Jun. 1, 2019).
Wen et al., "A Discriminative Feature Learning Approach for Deep Face Recognition," Computer Vision—ECCV 2016: 14th European Conference, Amsterdam, The Netherlands, Springer International Publishing, XP093253685, total 17 pages (Jan. 1, 2016).

* cited by examiner

METHOD OF TRAINING AN IMAGE CLASSIFICATION MODEL

CROSS-REFERENCE TO RELATED APPLICATIONS

This application is a National Stage of International Application No. PCT/CN2021/076105 filed on Feb. 8, 2021, which claims priority to United Kingdom's Patent Application No. GB2002157.2, filed on Feb. 17, 2020, both of which are hereby incorporated by reference in their entireties.

FIELD OF THE INVENTION

Embodiments of the present disclosure relate to training a neural network for image classification, in particular to a method of training a neural network for image classification on a dataset with noisy labels.

BACKGROUND

Image representation using Deep Convolutional Neural Network (DCNN) embedding with margin penalty is the method of choice for state-of-the-art image classification (for example, face recognition). DCNN maps the image, typically after a pose normalization step, into a feature embedding that achieves intra-class compactness and inter-class discrepancy.

To train the DCNN, each image in a dataset has to be labelled to relate to an identity class. Each identity class is intended to only contain images of a specific type/classification. There are several techniques to label each image; however there is the possibility that such techniques lead to incorrect labelling which is referred to as label noise.

SUMMARY

This specification discloses neural network systems for achieving image classification that are more robust to label noise.

According to a first aspect of this disclosure, there is provided a computer implemented method of training a neural network for classifying an image into one of a plurality of classes, the method comprising: extracting, from the neural network, a plurality of subclass center vectors for each class; inputting an image into the neural network, wherein the image is associated with a predetermined class; generating, using the neural network, an embedding vector corresponding to the input image; determining a similarity score between the embedding vector and each of the plurality of subclass center vectors; updating parameters of the neural network in dependence on a plurality of the similarity scores using an objective function; extracting a plurality of updated parameters from the neural network; and updating each subclass center vector in dependence on the extracted updated parameters.

The method may further comprise, prior to updating the parameters of the neural network: inputting a further image into the neural network, wherein the image is associated with a predetermined class; generating, using the neural network, a further embedding vector corresponding to the input image; determining a further similarity score between the further embedding vector and each of the plurality of subclass center vectors; wherein updating the parameters of the neural network is further in dependence on the further similarity scores.

The method may further comprise: determining a closest subclass center vector for each class using the similarity scores, wherein the objective function may comprise a multi-center loss term comparing the similarity score between the embedding vector and the closest subclass center vector from the predetermined class to the similarity scores between the embedding vector and the closest subclass center vectors from each of the other classes. The multi-center loss term may be a margin-based softmax loss function. The embedding vector and each subclass center vector may be normalized, and wherein the similarity score may be an angle between the embedding vector and the subclass center vector.

Each class may comprise a dominant subclass and wherein the method may further comprise: for each class, determining an intra-class similarity score between a dominant subclass center vector and each of the other subclass center vectors in the class, wherein the objective function comprises an intra-class compactness term that uses the intra-class similarity scores.

Each subclass center vector may be normalized, and wherein the intra-class similarity score may be an angle between the dominant subclass center vector and another subclass center vector in the class.

The neural network may comprise a plurality of connected layers, and wherein each subclass center vector may be updated using updated parameters extracted from the last fully connected layer of the neural network.

Each class may comprise a dominant subclass, wherein the method may further comprise discarding a non-dominant subclass from a class if the subclass center vector of the non-dominant subclass is above a threshold distance from the dominant subclass center vector of the class.

Discarding a non-dominant subclass from a class may be performed in dependence on a threshold condition being satisfied. The threshold condition may be a first threshold number of training epochs being exceeded. The method may further comprise discarding all non-dominant subclasses in dependence on a further threshold condition being satisfied. The further threshold condition may be a second threshold number of training epochs being exceeded.

The image may be a face image.

The class may correspond to a classification condition of the image, and wherein the image may be from a batch that contains label noise such that the batch may comprise at least one image labelled to relate to a class that does not correspond to the classification condition of the at least one image.

According to another aspect of this disclosure, there is provided a computer implemented method of image classification, the method comprising: inputting, to a neural network, a first image to map the first image to an embedding vector; and identifying, using the neural network, a class that corresponds to the first image based on the embedding vector, wherein the neural network has been trained using any one of the methods disclosed herein.

According to another aspect of this disclosure, there is provided a system comprising: one or more processors; and a memory, the memory comprising computer readable instructions that, when executed by the one or more processors, cause the system to perform any of the methods disclosed herein.

According to another aspect of this disclosure, there is provided a computer program product comprising computer readable instructions that, when executed by a computing device, cause the computing device to perform any of the method disclosed herein.

BRIEF DESCRIPTION OF THE DRAWINGS

Certain embodiments of the present invention will now be described, by way of example, with reference to the following figures.

DETAILED DESCRIPTION

In the embodiments described herein, an image classification neural network (such as a facial recognition neural network) is trained using subclass center vectors derived from the neural network, in addition to an embedding vector output by the neural network.

Use of subclass center vectors to form a multi-center based loss function can result in higher performance of image classification for a neural network trained on noisy data when compared to other methods of training a neural network on noisy data. For example, the image classification neural network may have a lower error rate. It can also allow the training of the neural network to be performed directly on raw datasets, reducing the need for resource intensive manual cleaning of the raw datasets.

In the following, embodiments will be described in relation to facial images (e.g. the image classification task is face recognition). However, it will be appreciated that the methods may also be applied to other image classification tasks, such as classifying medical images, classifying handwritten digits and classifying images of objects.

Figure 1:
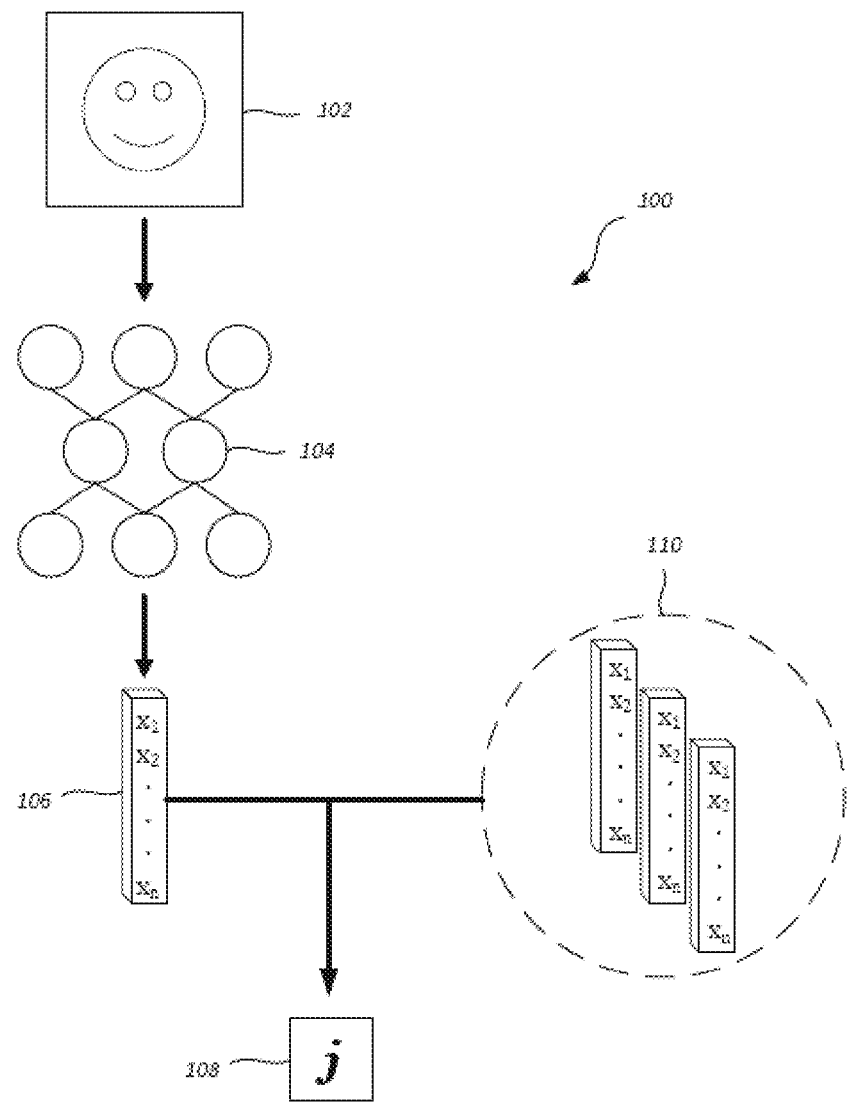
FIG. 1 shows a schematic overview of a method of generating an embedding vector from a sample.

FIG. 1 shows a schematic overview of a method 100 of generating an embedding vector 106 from an input image 102. The input image 102 may comprise an image of a face. The input image 102 is input into a neural network 104, which processes the input image 102 through a plurality of neural network layers to generate an embedding vector 106 encoding features in and/or properties of the input image 102. The embedding vector 106 is used to classify the image into one of a plurality of image classes 108 based on values of the components of the embedding vector 106.

The input image 102, I, comprises a set of pixel values in an array, such as a two-dimensional or three-dimensional array. For example, in a colour image $I \in \mathbb{R}^{H \times w \times 3}$, where H is the height of the face image in pixels, W is the width of the face image in pixels and the image has three colour channels (e.g. RGB or CIELAB). The image, I, may, in some embodiments, be in black-and-white/greyscale.

The neural network 104 comprises a plurality of layers of nodes, each node associated with one or more parameters. The parameters of each node of the neural network 104 may comprise one or more weights and/or biases. The nodes take as input one or more outputs of nodes in the previous layer. The one or more outputs of nodes in the previous layer are used by the node to generate an activation value using an activation function and the parameters of the neural network. One or more of the layers of the neural network 104 may be convolutional layers. One or more layers of the neural network 104 may be down-sampling (pooling) layers. One or more of the layers of the neural network 104 may be fully connected ("FC") layers. One or more of the layers of the neural network 104 may perform batch normalization ("BN"). One or more of the layers of the neural network 104 may be a dropout layer.

In some embodiments, the neural network 104 may comprise a residual network. For example, the neural network may comprise ResNet-100 or DenseNet, with BN-Dropout-FC-BN structure after the last convolutional layer. The final layer may, for example, generate a 256-D, a 512-D or a 1024-D embedding vector.

The embedding vector 106, $x_i \in \mathbb{R}^{M \times 1}$, for input image 102, i, is an M-dimensional vector, i.e. it comprises a plurality of components. The embedding vector is an encoded representation of the input image 102. The embedding vector may be normalized.

The embedding vector 106 may be used to classify the image into a class 108, j. The class 108 is one of a plurality of potential classes 108, C. Each class is associated with a class center vector 110, $X_j \in \mathbb{R}^{M \times 1}$, in embedding space. The embedding vector 106 is compared to the class center vectors 110 for each of the available classes 108 in order to classify the input image 102 into one of the available classes 108. For example, the input image 102 is classified into the class 108 with a class center vector 110 that is closest to the embedding vector 106 derived from that input image 102 by the neural network 104.

Each class of the plurality of classes 108 may relate to a certain feature of the input image 102. For example, the class 108 may relate to the identity of an input face image 102. The class 108 may relate to whether the input image 102 contains an indication of a medical condition. The class 108 may relate to the value of a handwritten digit in the input image 102. The class 108 may relate to the type of object contained within the input image 102.

Each class 108, j, may contain a plurality, K, of subclasses. Each subclass is associated with a subclass center vector, $w_{jk}$, in embedding space. The class center vector 110 of a class 108 may be based on one or more of the subclass center vectors of the class 108. For example, a class center vector 110 may be the subclass center vector of the dominant subclass in the class 108.

As a result of the training method discussed below, each subclass may relate to a specific feature of the input image 102. The specific feature may include the certain feature of the class 108 and comprise at least one additional feature. For example, the subclass may relate to the identity of an input face image 102 and whether the person is wearing glasses in the input face image 102. The subclass may relate to the input image 102 containing the indication of a medical condition and to the type of medical condition. The subclass may relate to the value of a handwritten digit in the input image 102 and to a feature about the shape of the handwritten digit. The subclass may relate to the type of object contained within the input image 102 and to the color of the object.

Since the positions of the subclass center vectors in embedding space are discovered by the training method discussed below, the specific feature of an input image 102, to which a subclass relates to, may only become apparent after completion of the training method. The specific feature may not be precisely determined but may be categorized as being that the input image 102 is correctly labelled to belong to a class 108 or that the input image 102 is incorrectly labelled to belong to a class 108. The specific feature of the input image 102 may be that the input image 102 is correctly labelled to relate to the certain feature of the class 108 and there may be only one, or more than one, subclasses relating to that specific feature per class. The specific feature of the input image 102 may be that the input image 102 is incorrectly labelled to relate to the certain feature of the class 108 and there may be one, or more than one, subclasses relating to that specific feature per class.

Figure 2:
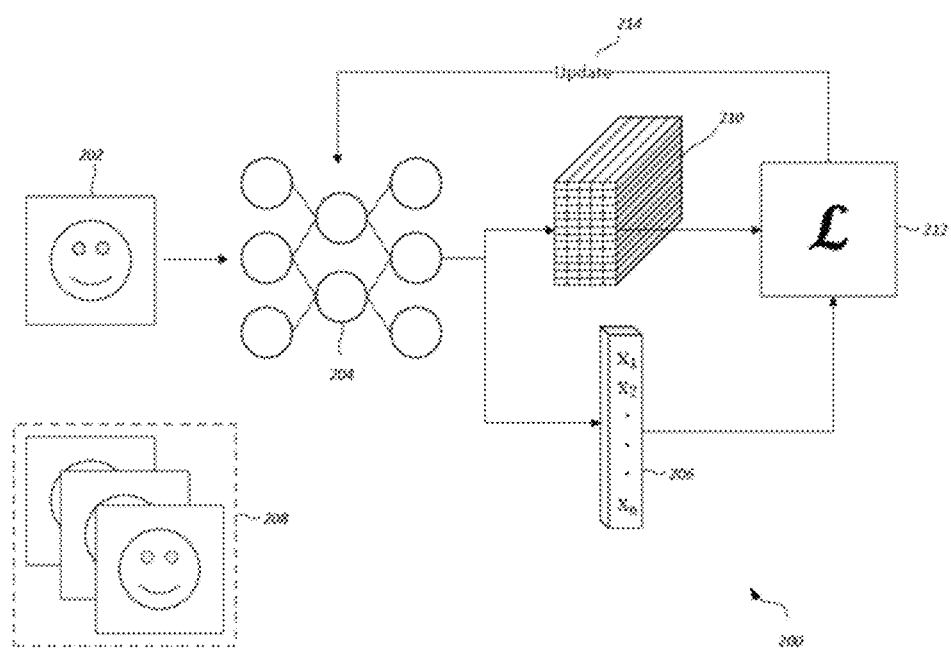
FIG. 2 shows a schematic overview of a method of training a neural network for image classification using a multi-center based objective function.

FIG. 2 shows a schematic overview of a method 200 of training a neural network for image classification using a multi-center based objective function. An image 202 from a training batch 208 is input into the neural network 204. The neural network 204 processes the input image through a series of layers, and outputs an embedding vector 206. Subclass center vectors 210 are also extracted from weights in one or more of the final layers of the neural network 204. An objective function 212, $\mathcal{L}$, is evaluated based on the embedding vector 206 and the extracted subclass center vectors 210, and used to determine parameter updates 214 for the neural network 204.

The training batch 208 comprises at least one image 202. The batch 208 may comprise a plurality of images. Each image in the batch 208 is labelled to relate to one of a plurality of predefined classes. The batch 208 may be an entire training dataset or may be a subset of the training dataset. The batch 208 and/or the training dataset may contain label noise, e.g. comprise one or more incorrectly labelled images.

A plurality of subclasses is defined for each class based on weights extracted from the neural network 204. The weights define a subclass center vector 210 for each of the subclasses.

The parameters of the neural network 204 are trained using an objective function 212, $\mathcal{L}$, (also referred to herein as a loss function). A loss function may be considered to be a measure of the error of the neural network 204, with the aim of the training 200 to minimize/approximately minimize the loss function over the training dataset. The objective function 212 may comprise a function based at least in part on a comparison involving a subclass center vector 210 of a subclass.

The initial number, K, of subclasses per class may be set by setting parameters of the neural network 204. The initial number, K, of subclasses per class is set by setting the dimension of the final layer (or layers) of the neural network 204. The initial number, K, of subclasses per class should be sufficiently large to separate noisy data from clean data. The initial number, K, of subclasses per class may be chosen based on experimental results to determine the value of K which trains the neural network 204 to be the most accurate. The initial value of K may be, between three and fifteen, such as between three and ten, for example 10, 5 or 3. On a typical noisy training dataset, such as Celeb500K, setting the value of K to be 3 results in an improved performance of the trained neural network 204 compared to setting the value of K to be 5 or 10.

The parameters of the neural network 204 may be updated after each image 202 has been input into the neural network 204. Alternatively, the parameters of the neural network 204 may be updated after a plurality of images 202 has been input into the neural network 204 and the value of the objective function for each image 202 determined. For example, the parameters of the neural network 204 may be updated after a batch 208 has been input into the neural network 204. The objective function may be averaged over the batch 208.

Updates 214 to the neural network 204 are determined in dependence on the objective function 212. An optimization procedure, such as stochastic gradient descent, may be applied to the objective function 212 in order to determine the updates 214.

An epoch refers to one cycle through the full training dataset. For example, an epoch may correspond to one forwards pass and one backwards pass through the training dataset. An epoch may correspond to each image 202 in the training dataset being input to the neural network 204 at least once. The learning rate of the updates 214 may vary throughout the training. For example, the learning rate may start at a first value, such as 0.1, and be divided by a predetermined factor or factors at threshold numbers of iterations, such as being divided by ten at ten and sixteen epochs. The training 200 may stop after the completion of a threshold number of epochs. The threshold number of epochs may be in the range [20, 40], preferably in the range [20, 30], for example at 20 or 30 epochs. In embodiments where the optimization procedure uses a momentum based approach, the momentum of the updates 214 may be set to a value in the range [0.5, 0.99], preferably in the range [0.85, 0.95], for example 0.9. Also, the weight decay may be set to a positive number that is less than one, preferably much less than one, for example $5e^{-4}$.

Each image 202 in the batch 208 is labelled to relate to a class and the feature embedding vector 206 derived from the image 202 is labelled to relate to the same class. In embedding space, each class contains the feature embedding vectors 206 that are labelled to relate to the class.

A subclass within a class may comprise noisy data, in particular, the subclass may only comprise noisy data. For example, a subclass may contain feature embedding vectors 206 that are incorrectly labelled. A feature embedding vector 206 in a class is within the subclass in the class having the subclass center vector 210 that is nearest to the feature embedding vector 206. To remove the noisy data from the training dataset, the neural network 204 may drop subclasses which are above a threshold distance from the dominant subclass. The threshold distance may be based on the difference between the subclass center vector 210 of the subclass and the subclass center vector 210 of the dominant subclass. The threshold distance may be an angular difference in the range of [60°, 90°], preferably in the range [70°, 80°], for example 70°, 75° or 80°. The dominant subclass of a class is the subclass containing the most feature embedding vectors 206 within the class.

The neural network 204 may drop non-dominant subclasses that satisfy a threshold condition after the neural network 204 has discriminative power, and proceed with training on the basis of the remaining subclasses. The neural network 204 may be assumed to have sufficient discriminative power after the completion of a threshold number of epochs, for example in the range [10, 20], such as the completion of 15 epochs.

Updating the parameters may result in a new set of weights in the final layer (or layers) of the neural network 204, thus updating the subclass center vectors 210.

Figure 3:
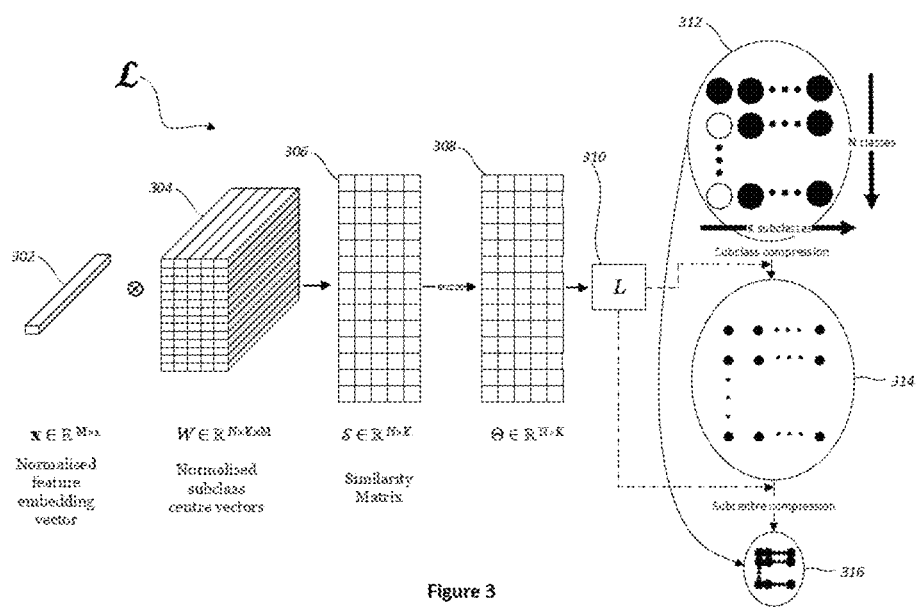
FIG. 3 shows a schematic overview of a multi-center based objective function.

FIG. 3 shows a schematic overview of a method 300 of determining a multi-center based objective function 310. An embedding vector 302 output by a neural network and a set of subclass center vectors 304 are used to determine a similarity score 306 between the embedding vector 302 and each of the subclass center vectors 304. The similarity scores 306 are each converted to an angular representation 308. A multi-center based objective function 310 is calculated based on the angular representation 308 of the similarity scores 306. The objective function 310 is used to update parameters of the neural network. The objective function 310 may have the effect of compressing the subclasses 314 and/or compressing subcenters 316 of the classes.

The subclass center vectors 304 may be extracted from the final layer (or layers) of the neural network. For example, the subclass center vectors 304 may be extracted from the final fully connected ("FC") layer of the neural network. The final layer of the neural network may be a linear layer and can also be referred to as a weight matrix. The subclass center vectors 304 may be represented as a tensor, $W \in \mathbb{R}^{N \times K \times M}$, where N is the number of classes, K is the number of subclasses per class and M is the dimension of the feature embedding vector 302, i.e. each of the K subclass center vectors 304 per class are a vector of dimension M. The subclass center vectors 304 may each be normalized.

Prior to training, the parameters of the neural network may be randomly initialized. As a result, the subclass center vectors 304 may also be initially randomly set.

The similarity score 306 between an embedding vector 302, $x_i$, and a subclass center vector 304, $w_{jk}$, is a measure of the difference between the embedding vector 302 and the subclass center vector 304. The similarity scores 306 between the current embedding vector 302, $x_i$, and all of the NK subclass center vectors 304 can be represented as a matrix $S \in \mathbb{R}^{N \times K}$. The current embedding vector 302, $x_i$ corresponds to the feature embedding vector 302, $x_i$ of the latest input image. The similarity score 306 between an embedding vector 302 and a subclass center vector 304 can be calculated in a number of ways. One example is to take a dot product between the embedding vector 302 and a subclass center vector 304, i.e.:

$$S_{ijk} = x_i \cdot w_{jk}.$$

The embedding vector 302 and the subclass center vector 304 may be normalized using, for example, the $\ell^2$-norm. Another example is to use a pooling step. Other examples include a Euclidean distance between the vectors, absolute value norms, Euclidean norms, Taxicab norms and/or p-norms.

The similarity scores 306 may, in some embodiments, be converted to an angular representation 308 for use in the multi-center based objective function 310. The angular representation 308 provides an angle between the current embedding vector 302 and each of the subclass center vectors 304. For example, the angular representation 308 may be determined by taking the inverse cosine (arcos) of the similarity score 306:

$$\theta_{i,j_k} = \text{arc cos } S_{ijk}$$

For each class, j, a "closest" subclass center vector 306 to the embedding vector 302 is determined based on the similarity score 306 (or, in some embodiments, its angular representation 308). The closest subclass center vector 304 may, for example, be determined by finding the smallest value of $\theta_{i,j_k}$ for that class, i.e.:

$$\theta_{i,j} = \min_k \theta_{i,j_k}$$

The set of closest subclass center vectors 304 for each class may be used to evaluate the loss function 310, from which parameter updates may be determined.

The objective function 310 may comprise a multicenter loss term, L, $\ell_{multicentre}$. The multi-center based loss function 310 may comprise a comparison between the similarity scores 306 between an embedding vector 302 relating to a particular class and the closest subclass center vectors 304 of all of the classes. In other words, the multicenter loss term may compare a distance from an embedding vector 302 to the closest subclass center vector 304 for the predetermined class with the distances to the closest subclass center vector 304 for each of the other classes.

The multicenter loss term may be an additive angular margin loss. For example, the multicenter loss term may be the margin based softmax function taken with respect to the closest subclass center vectors 304 for each class. An example of such a multicenter loss term based on the ArcFace loss function is given by:

$$\ell_{multicentre} = -\log \frac{e^{s \cos(\theta_{i,y_i} + m)}}{e^{s \cos(\theta_{i,y_i} + m)} + \sum_{j=1, j \neq y_i}^{N} e^{s \cos(\theta + m)}}$$

where m is a margin penalty, s is a feature scale, and $y_i$ is the predetermined class label of the input image from the training dataset. The margin loss may lie in the range [0.1, 1], preferably in the range [0.3, 0.7]. For example, the margin loss may be 0.5. The feature scale may line in the range [16, 128], preferably in the range [32, 128]. For example, the feature scale may be 64.

Although the above term of the multi-center based softmax loss function 310, L, is based on ArcFace, it is to be understood that this is merely an example and the invention is not limited to using ArcFace. The method of training a neural network using a multi-center based softmax loss can be applied to any method using softmax loss that compares a sample to a class center vector. For example, the method of training a neural network using a multi-center based softmax loss function can be applied to SphereFace loss and CosFace loss in an analogous way to the above application to ArcFace loss.

The multi-center based loss function 310 encourages the subclass center (subclass center vector) 304 distribution to be compact, which is beneficial for inter-class comparison, as more negative subclass centers can approximate the distribution of all negative samples. Given an initial distribution 312 of K subclass centers for each of N classes, the multi-center loss term compresses the subclasses 314 such that the samples in each subclass are more tightly clustered around their subclass center vector 304. The multi-center loss term may be averaged over samples from a training batch before the updates are determined.

The method of training a neural network using a multi-center based softmax loss as described above is able to automatically discover subclass centers (subclass center vectors) 304 within each class. Compared to ArcFace, the method of training a neural network using a multi-center based softmax loss function improves the robustness in both aspects of marginal losses: 1) push the anchor close to positive centers and 2) push the anchor away from negative centers.

In some embodiments, the objective function 310 may further comprise an intra-class compactness term, L, $\ell_{intra}$. The intra-class compactness term compares subclass center vectors 304 in each class to the dominant subclass center 304 of their class. The intra-class compactness term penalizes deviations of subclass center vectors 304 in each class from the dominant subclass center 304 of their class, thus encouraging subclass center vectors 304 to cluster around the dominant subclass of their class (i.e. subcenter compression 316). An example of such an intra-class compactness term may be given by:

$$\ell_{intra} = \frac{\sum_{j=1}^{N} \sum_{k=1, k \neq k'}^{K} \theta_{j_{k'}, j_k}}{N(K-1)}$$

where k' is the dominant subclass for class j, and $\theta_{j_k, j_k}$ is the angle between the subclass center vector $w_{jk}$ and the dominant subclass center vector $w_{jk'}$.

The dominant subclass for each class is the subclass that contains the most images (or embedding vectors 302 that correspond to the images) in the class. It may be assumed that the dominant subclass contains accurately labelled samples. In other words, the dominant subclass for each class may be assumed to contain clean data. An image relating to a class is within the subclass from the class having a subclass center vector 304 to which the embedding vector 302 corresponding to the image is closest to.

The objective function 310 may comprise a combination of the multi-center loss term and the intra-class compactness term. The multi-center loss term may be averaged over samples from a training batch before the updates are determined. An example of such a combined loss function is given by:

$$\mathcal{L} = \frac{1}{B} \sum \ell_{multicentre} + \lambda \ell_{intra}$$

where B is the batch size and λ is a hyperparameter controlling the relative importance of the intra-class compactness term to the multicenter loss term. As an example, the batch size may be 512 samples.

Figure 4:
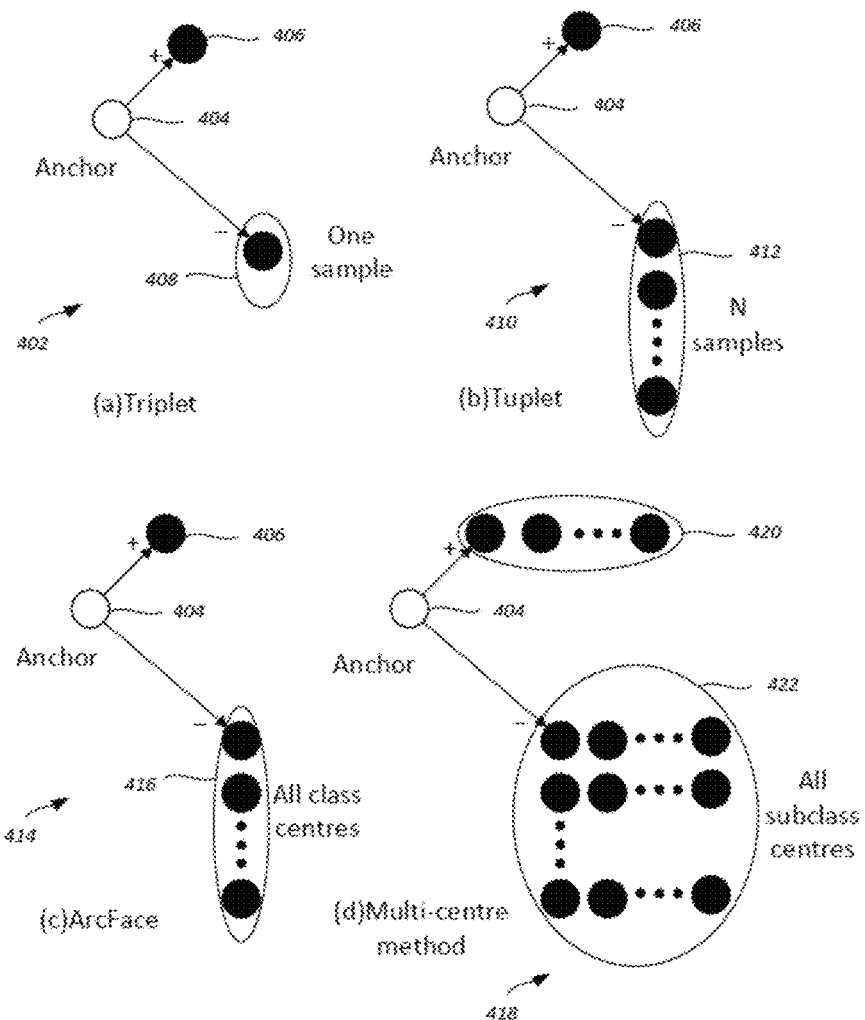
FIG. 4 shows a comparison of a Triplet loss, a Tuplet loss, an ArcFace loss and a multi-center based loss.

FIG. 4 shows a comparison 400 of a Triplet loss, a Tuplet loss, an "ArcFace" loss and an embodiment of a multi-center based loss. There are two main lines of research to train Deep Convolutional Neural Networks (DCNNs) for image classification (such as facial recognition): those that train a multi-class classifier which can separate different identities in the training dataset, such by using a softmax classifier; and those that learn directly an embedding, such as the triplet loss. Based on a large-scale training dataset and elaborate DCNN architectures, both the softmax-loss-based methods and the triplet-loss-based methods can obtain excellent performance on image classification.

Triplet loss 402 simultaneously enforces intra-class compactness and inter-class discrepancy on a triplet $(x_i, x_j, x_k)$ such that samples from the same class are closer than samples from different classes by a clear Euclidean distance margin m. Triplet loss compares the difference between samples from the same class with the difference between samples from a different class. In particular, triplet loss compares the difference between a sample $(x_i)$ from a class 404 and a sample $(x_j)$ from the same class 406 with the difference between the sample 404 $(x_i)$ and a sample $(x_k)$ from a different class 408. The difference between samples may be based on the deep feature embedding of the samples.

An example of a triplet loss is:

$$\forall i, j, k, \ \|x_i - x_k\|_2^2 - \|x_i - x_j\|_2^2 \geq m,$$

where $x_i$ and $x_j$ are from the same class and $x_k$ is from a different class, and m is a Euclidean distance margin.

Since the number of total triplets can be cubic in the number of samples, the triplet loss 402 method suffers from slow convergence and often requires expensive data sampling tricks to provide nontrivial triplets to accelerate the training.

Tuplet loss 410 recruits multiple negative samples to avoid expensive hard negative data mining in the triplet loss 402. Tuplet loss 410 compares the difference between an anchor (sample) 404 and a positive sample 406 to the anchor with the difference between the anchor 404 and a plurality of negative samples 412. For example, for an (N+1)-tuplet training sample $\{x_i, x_1, \ldots, x_{y_i}, \ldots, x_N\}$, where $x_{y_i}$ is a positive sample to $x_i$ and $\{x_j\}_{j=1, j \neq y_i}^{N}$ are negative samples is used. The (N+1)-tuplet loss is defined as follows:

$$\ell_{tuplet}(x_i, \{x_j\}_{j=1}^{N}) = -\log \frac{e^{x_{y_i}^T x_i - m}}{e^{x_{y_i}^T x_i - m} + \sum_{j=1, j \neq y_i}^{N} e^{x_j^T x_i}}$$

The tuplet loss 410 is similar to the multi-class logistic loss (i.e., softmax loss) formulation when $\{x_j\}_{j=1}^{N}$ are viewed as weight vectors. When N=2, the corresponding (2+1)-tuplet loss highly resembles the triplet loss as there is only one negative sample for each pair of input and positive sample. When N>2, the (N+1)-tuplet loss is a partition function estimation of an ideal (L+1)-tuplet loss, where an (L+1)-tuplet loss couples with all negative samples. The (N+1)-tuplet loss is a better approximation than the triplet loss as the larger the value of N, the more accurate the approximation.

Margin-Based Softmax 414 compares the difference between an anchor (sample) 404 and its corresponding weight vector (i.e. a current class center vector for the class to which the sample belongs) 406 with the difference between the anchor and non-corresponding weight vectors (i.e. current class center vectors for classes to which the sample does not belong) 416. Margin-Based Softmax employs a penalty into the softmax loss. The Margin-Based Softmax loss may be defined as follows:

$$\ell_{softmax_{margin}}(x_i) = -\log \frac{e^{W_{y_i}^T x_i - m}}{e^{W_{y_i}^T x_i - m} + \sum_{j=1, j \neq y_i}^{N} e^{W_j^T x_i}}$$

where $W_j \in \mathbb{R}^{512 \times 1}$ denotes the j-th column of weight $W \in \mathbb{R}^{512 \times N}$ and N is the class number.

Applying $\ell^2$ normalization, or any other suitable type of normalization, to both $W_j$ and $x_i$, $W_j^T x_i = \|W_j\| \|x_i\| \cos \theta_j$, where $\theta_j$ is an angle between the weight $W_j$ and the embedding vector $x_i$, then the CosFace loss is:

$$\ell_{CosFace} = -\log \frac{e^{s(\cos \theta_{y_i} - m)}}{e^{s(\cos \theta_{y_i} - m)} + \sum_{j=1, j \neq y_i}^{N} e^{s(\cos \theta_j)}},$$

where s is a scaling factor. Compared to (N+1)-tuplet loss, margin-based softmax methods extensively employ all negative classes for comparison instead of part negative samples, and efficiently index the proxy representation ($W_j$) of each class from a GPU memory instead of online feature embedding for all samples.

ArcFace further has an additive angular margin loss. ArcFace incorporates a margin, m, into a measure of the similarity between vectors. In particular, ArcFace incorporates an angular margin, m, which has a better geometric interpretation. For example, ArcFace loss may be defined as follows:

$$\ell_{ArcFace} = -\log \frac{e^{s\,cos(\theta_{y_i}-m)}}{e^{s\,cos(\theta_{y_i}-m)} + \sum_{j=1, j\neq y_i}^{N} e^{s\,cos\theta_j}},$$

which not only achieves better performance but also has a better geometric interpretation.

Since Triplet loss, Tuplet loss, CosFace loss and ArcFace loss methods assume a clean dataset, the methods all need to be trained on carefully pre-processed clean datasets, which requires intensive human efforts. Images with label noise greatly degenerate the recognition accuracy of these methods. Label noise occurs when a sample 404 is labelled to relate to a class to which it does not belong. In other words, each sample 404 has a characterizing feature and each class label corresponds to a characterizing feature. A noisy label is a label that corresponds to a characterizing feature and is attached to a sample that has a different characterizing feature. Large-scale datasets, in particular face image datasets, often contain noise, which can be modelled as label noise. Generally, there are two types of label noise: one is open-set label noise, i.e., samples whose true labels are out of the training label dataset but are wrongly labelled to be within the dataset; and the other one is closed-set label noise, i.e., samples whose true labels are in the training label dataset but are wrongly labelled.

To achieve a more robust image classification neural network that is less susceptible to label noise, embodiments of the present invention relate to a method of training a neural network using a multi-center based softmax loss function. The method comprises setting a number of subclasses per class. In particular, embodiments of the present invention relate to a method of training a neural network for image classification using a multi-center based ArcFace loss function, however it will be appreciated that the present invention is not limited to being applied to the ArcFace loss function. In particular, the method can be applied using any softmax loss function.

According to an embodiment, the multi-center based softmax loss 418 comprises a comparison between similarity scores between an embedding vector 404 relating to a particular class and the subclass center vectors of all of the classes. The multi-center based softmax loss function 418 may comprise a comparison between similarity scores between an embedding vector 404 relating to a particular class and all of the classes, wherein each class is represented by one of a plurality of a subclass center vectors associated with that class. For example, the multi-center based softmax loss function 418 may comprise a comparison between the similarity score between an embedding vector 404 relating to a particular class and the subclass center vector 420 within the class that is nearest to the embedding vector 404 and the similarity score between the embedding vector 404 and a subclass center vector 422 within a different class. Moreover, the multi-center based softmax loss function 418 may comprise a comparison between the similarity score between an embedding vector 404 relating to a particular class and the subclass center vector 420 within the class that is nearest to the embedding vector 404 and the similarity score between the embedding vector 404 and a subclass center vector 422 within a different class that is furthest from the embedding vector 404. Also, the multi-center based softmax loss function 418 may comprise a comparison between the similarity score between an embedding vector 404 relating to a particular class and the subclass center vector 420 within the class that is nearest to the embedding vector 404 and the similarity score between the embedding vector 404 and a subclass center vector 422 within a different class that is nearest to the embedding vector 404.

Figure 5:
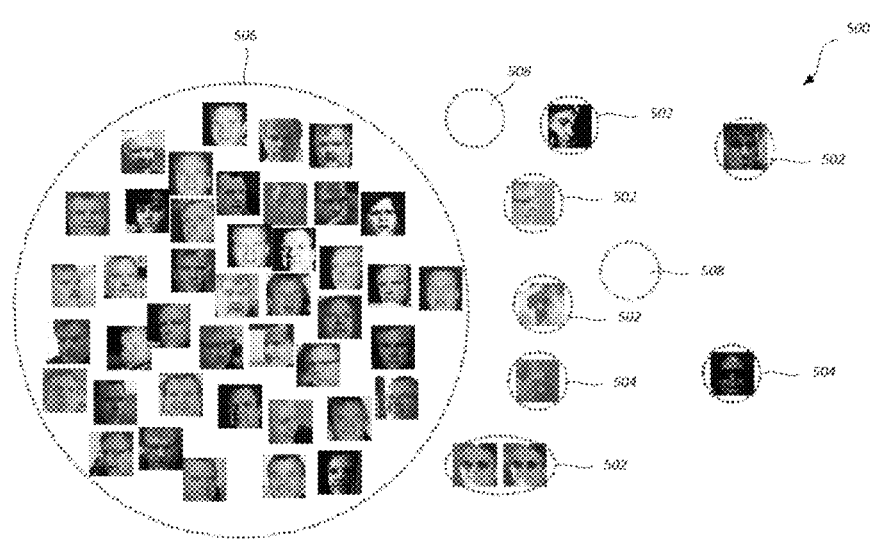
FIG. 5 shows an illustration of subclasses for a particular class.

FIG. 5 shows a schematic illustration of subclasses in embedding space for a particular class 500. A single class 500 from a dataset is visualized after employing multi-center based ArcFace loss for training. Training the neural network using the multi-center based ArcFace loss function results in the neural network clustering images such that hard samples 502 and noisy samples 504 are separated away from the dominant clear and clean samples 506. Some subclasses may be empty 508 if the number of subclasses is too large for the class.

An advantage of using the multi-center based loss is that noisy samples can be discarded into non-dominant subclasses and so the method is more robust to training on noisy data.

Similar to ArcFace, the multi-center based softmax loss function has an objective with two parts: 1) push the anchor (i.e. the embedding vector of an image in a class) close to a positive center (i.e. nearest subclass center from the class) and 2) push the anchor (i.e. the embedding vector) away from negative centers (i.e. subclass centers of other classes that are nearest to the embedding vector of the image).

It may be assumed that clean data is dominant for each class. If clean data is dominant for each class, training the neural network using the multi-center based softmax loss function encourages the data to be partitioned into one dominant subclass that contains clear and clean images and multiple non-dominant subclasses that contain hard images or noisy images, e.g., as shown in FIG. 5. This happens because the first-part objective of the method of training a neural network using a multi-center based softmax loss function pushes the anchor to be close to one of the multiple positive subclass centers but not all of them. In particular, the anchor is pushed closer to the subclass center within the same class that is closest to the anchor. If the anchor is a noisy image 504 or a hard image 502, it is hard to push the anchor to the dominant subclass center. Note that it is relatively easy to push the majority of clean samples to the dominant subclass. Therefore, the noisy images are likely to only affect and/or form non-dominant subclass(es) but not the dominant subclass. The method of training a neural network using a multi-center based softmax loss function is therefore robust to open-set label noise.

For closed-set label noise, its impact to the first part objective of the method of training a neural network using a multi-center based softmax loss function is similar to the open-set label noise discussed above. For the second part objective, the closed-set label noise can be modelled by $P(\tilde{Y}=\tilde{y}|Y=y, X=x)$, where $\tilde{Y}$ and Y represent the random variables for observable noisy label and latent true label, respectively. The probability $P(\tilde{Y}\neq y|Y=y, X=x)$ represents the noise level; the larger the probability is, the less reliable the noisy data is. Let $\tilde{Y}$ denote the random variable for the complementary subclass label, e.g., $P(\overline{Y}=i|X=x)$ specifies the probability of a subclass i that the image x does not belong to.

The second-part objective of the method of training a neural network 200 using a multi-center based loss function transforms the noisy data into complementary data with $K(N-1)$ complementary subclasses. Specifically, given a noisy anchor point $(x, \tilde{y})$, instead of fitting $(x, \tilde{y})$ directly, the second-part objective of the method of training a neural network 200 using a multi-center based loss function generates and fits the complementary data $(x, \overline{y}=i)$, $i=1, \ldots, K(N-1)$, where i is the index of all the subclasses of non-positive classes. The complementary data is the subclass labels. Since the complementary data is generated equally according to each subclass, we have $P(\overline{Y}=i|X=x)=1/(K(N-1))$. Similarly, we can use $P(\overline{Y}=y|Y=y, X=x)$ to represent the noise level; the larger the probability is, the less reliable the complementary data is.

As shown below, with more centers/subclass centers, the complementary data will be more reliable than the noisy data.

We have $$P(\tilde{Y} \neq y | Y = y, X = x) =$$

$$\sum_{i \neq y} P(\tilde{Y} = i | Y = y, X = x) = \sum_{i \neq y} \frac{1}{K(N-1)} \sum_{j \neq i} P(\overline{Y} = j | Y = y, X = x) =$$

$$\frac{1}{K(N-1)} \sum_{i \neq y} P(\overline{Y} \neq i | Y = y, X = x) =$$

$$1 - \frac{1}{K(N-1)} \sum_{i \neq y} P(\overline{Y} = i | Y = y, X = x)$$

where the second equation holds because the second part objective of multicenter based softmax loss transforms a noisy data point $(x, \tilde{y})$ into $K(N-1)$ complementarily labelled data points equally. We also have $$P(\overline{Y} = y | Y = y, X = x) = 1 - \sum_{i \neq y} P(\overline{Y} = i | Y = y, X = x)$$

Where Y represents the true class label, $\tilde{Y}$ represents the noisy class label and $\overline{Y}$ represents the subclass label for a noisy anchor point $(x, \tilde{y})$:

$$P(\overline{Y}=y|Y=y,X=x) < P(\tilde{Y} \neq y|Y=y,X=x). \quad (1)$$

More specifically, $$P(\tilde{Y} \neq y | Y = y, X = x) - P(\overline{Y} = y | Y = y, X = x) = \quad (2)$$

$$\frac{K(N-1)-2}{K(N-1)-1} \sum_{i \neq y} P(\overline{Y} \neq i | Y = y, X = x).$$

Eq. 1 states that employing the complementary data will be more reliable than directly using the noisy data. Eq. 2 implies that with more centers/subclasses, i.e., larger K, the gap between the noise levels of complementary data and noisy data will become larger, which means that with more centers/subclasses, the complementary data will be more reliable than the noisy data.

Figure 6:
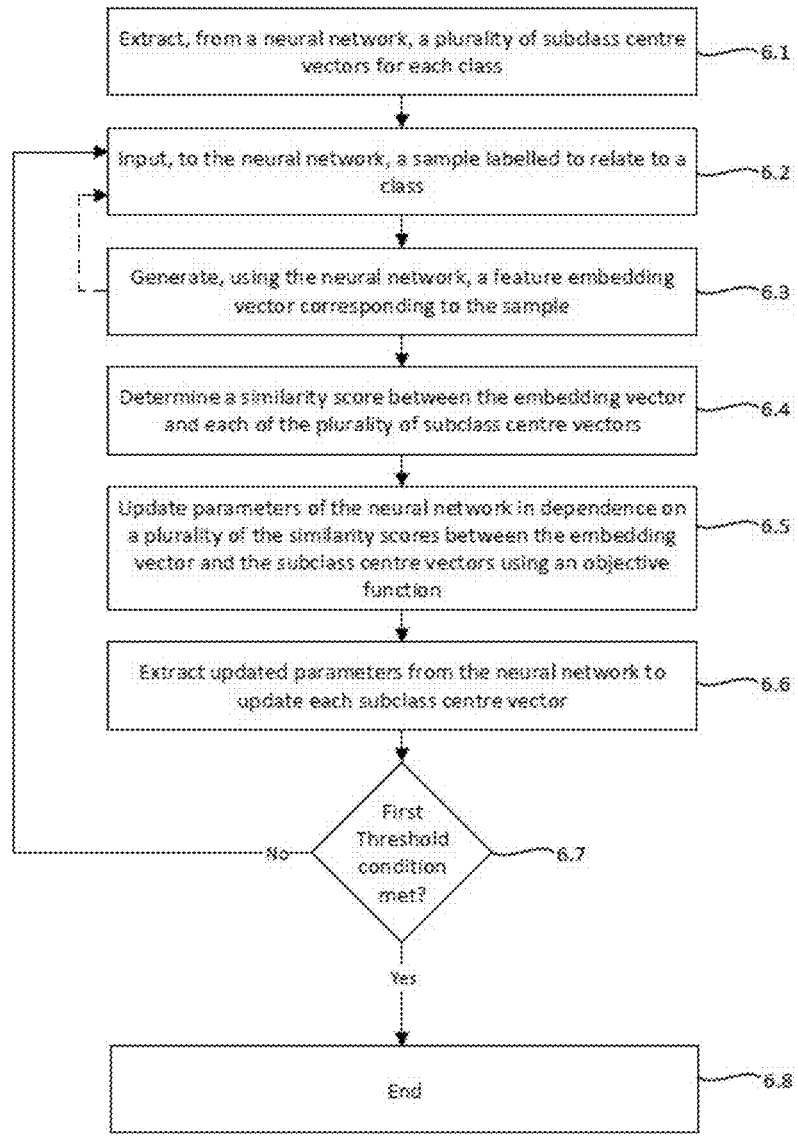
FIG. 6 shows a flow diagram of a method of training a neural network for image classification.
Figure 7:
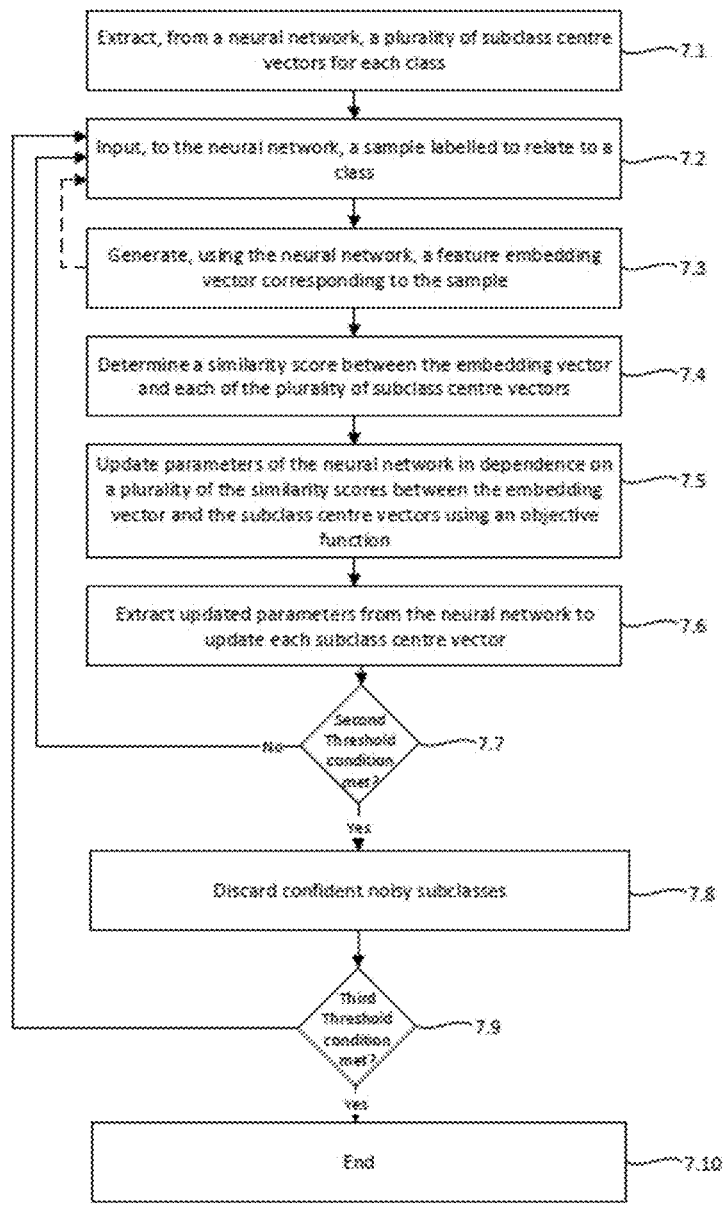
FIG. 7 shows a flow diagram of a method of training a neural network for image classification.
Figure 8:
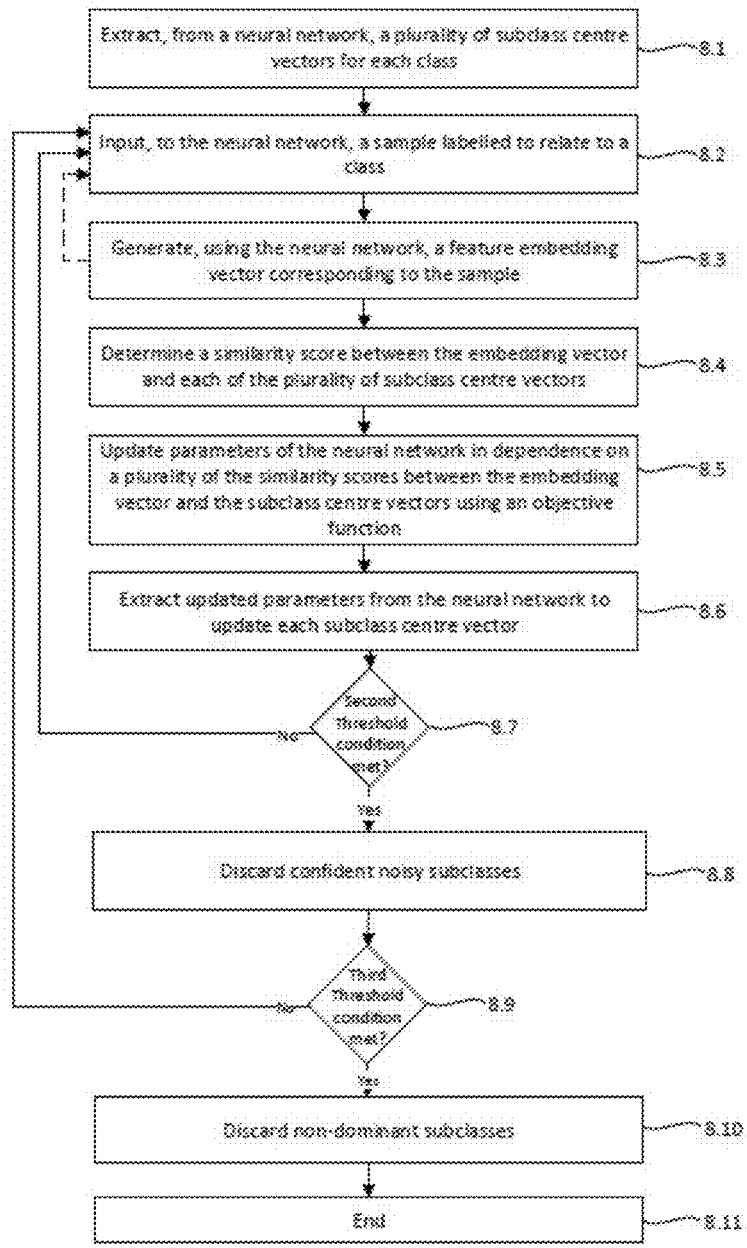
FIG. 8 shows a flow diagram of a method of training a neural network for image classification.

FIGS. 6 to 8 show flow diagrams of methods of training a neural network for image classification using a multi-center based softmax loss function. The methods may be implemented on a computer. The methods may correspond to using any multi-center based softmax loss function described above. The methods may be performed for each image in a batch. The methods may be performed for each image in a plurality of batches wherein each batch comprises images from a training dataset.

At operation 6.1, a plurality of subclass center vectors for each class is extracted from a neural network. The subclass center vectors may correspond to weights in a final layer (or layers) of the neural network. Initial weights of the neural network may be initialized randomly.

At operation 6.2, a sample image labelled to relate to a particular class is input into the neural network. The sample image is taken from a training dataset comprising a plurality of images, each labelled as belonging to a corresponding class.

At operation 6.3, a feature embedding vector is generated from the sample image using the neural network. The neural network processes the sample image through a plurality of layers and outputs an embedding vector representing the sample image. The embedding vector is labelled to belong to the same class as the sample image.

At operation 6.4, a similarity score is determined between the embedding vector and each of the plurality of subclass center vectors. That is, for each subclass in each class, a similarity score between the embedding vector and the subclass center vector is determined. The similarity score may be determined by taking a norm between the embedding vector and a subclass center vector. A pooling layer may be used to determine the similarity scores. The similarity score may represent an angle between the embedding vector and the subclass center vector. In some embodiments, a closest subclass center vector from each class is determined using the similarity scores.

Operations 6.2 to 6.4 may be iterated over a training batch to determine similarity scores between the embedding vector for each image in the batch and the subclass center vectors. In other words, each embedding vector generated from the batch by the neural network has a similarity score calculated with each of the subclass center vectors.

At operation 6.5, parameters of the neural network are updated in dependence on a plurality of the similarity scores between the embedding vector and the subclass center vectors using an objective function. The parameter updates may be determined by applying an optimization procedure, such as stochastic gradient descent, to the objective function.

The objective function may comprise a multi-center based loss term comparing the similarity score between the embedding vector labelled to relate to a class and the closest subclass center vector from the class to the similarity scores between the embedding vector and the closest subclass center vectors from each of the other classes. The multi-center based loss term may be a margin-based softmax loss function.

In some embodiments, the updates may be determined based on the similarity scores for a batch of training data rather than just a single training example.

In some embodiments, each class comprises a dominant subclass. The dominant subclass is the subclass in a class with the most training examples associated with it, e.g. having a subclass center vector with the most embedding vectors of training images closest to it. The dominant subclass in each class may be updated during training. The method may further comprise: for each class, determining an intra-class similarity score between a dominant subclass center vector and each of the other subclass center vectors in the class, wherein the objective function comprises an intra-class compactness term that uses the intra-class similarity scores. The intra-class similarity score may be an angle between the dominant subclass center vector and another subclass center vector.

At operation 6.6, updated parameters of the neural network are extracted to determine updated subclass center vectors. Updated parameters from the final layer (or layers) of the neural network may be extracted to define the updated subclass center vectors.

At operation 6.7, a first threshold condition is checked. If the first threshold condition is satisfied, the training may be terminated, or a next training phase (as described below in relation to FIGS. 7 and 8) may be entered. For example, if the first threshold condition is satisfied, the neural network may discard non-dominant subclasses before the training is terminated. If the first threshold condition is not satisfied, operations 6.2 to 6.7 are repeated with the updated subclass center vectors. The first threshold condition may be the completion of a predefined number of epochs. For example, the first threshold condition may be the completion of a number of epochs in the range [20, 50], preferably in the range [30, 40]. In particular, the first threshold condition may be the completion of 30 epochs.

Referring to FIG. 7, operations 7.1 to 7.6 are identical to operations 6.1 to 6.6.

At operation 7.7, a threshold condition relating to the discriminative power of the network (referred to herein as the second threshold condition to distinguish it from the first threshold condition described in relation to FIG. 6) is checked. If the second threshold condition is satisfied, the neural network is taken to have sufficient discriminative power. In other words, if the second threshold condition is satisfied, it may be determined that the neural network has been sufficiently trained to separate noisy data from clean data. If the second threshold condition is not satisfied, operations 7.2 to 7.7 are repeated with the updated subclass center vectors. The second threshold condition may be the completion of a certain number of epochs. For example, the second threshold condition may be the completion of a predetermined number of epochs. The predetermined number of epochs may be in the range [10, 20], for example the completion of 15 epochs.

At operation 7.8, the neural network discards subclasses in a class having a subclass center vector that is above a threshold distance from the dominant subclass center vector of the class. The subclasses may be discarded to be removed from the training dataset. Such a step actively removes data determined to be noisy to prevent the noisy data from negatively affecting the training of the neural network.

At operation 7.9, a termination threshold condition is checked (also referred to herein as a third threshold condition). If the third threshold condition is satisfied, the training may be terminated. If the third threshold condition is not satisfied, operations 7.2 to 7.9 are repeated with the updated subclass center vectors. The third threshold condition may be the completion of a certain number of epochs. For example, the third threshold condition may be the completion of a number of epochs in the range [20, 50], preferably in the range [30, 40]. In particular, the third threshold condition may be the completion of 30 epochs. The third threshold condition may be the same as the first threshold condition.

Referring to FIG. 8, operations 8.1 to 8.8 may be identical to operations 7.1 to 7.8.

At operation 8.9, if the third threshold condition is satisfied, it is determined that the neural network has been sufficiently trained and the next training phase is entered. If the third threshold condition is not satisfied, operations 8.2 to 8.9 are repeated with the updated subclass center vectors. The third threshold condition may be the completion of a certain number of epochs. For example, the third threshold condition may be the completion of a number of epochs in the range [20, 50], preferably in the range [30, 40]. In particular, the third threshold condition may be the completion of 30 epochs. The third threshold condition may be the same as the first threshold condition.

At operation 8.10, the neural network discards non-dominant subclasses within a class. As a result, each class only contains the dominant subclass and so each class is represented by the dominant subclass center vector.

At operation 8.11, the training is terminated.

Figure 9:
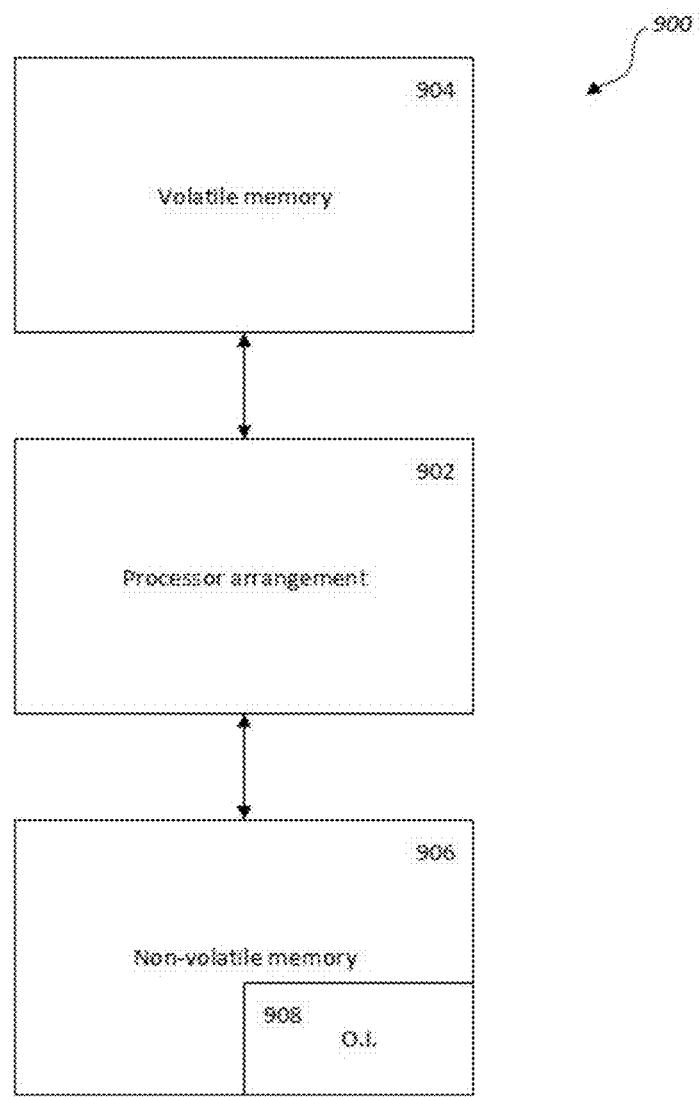
FIG. 9 shows an example of a computer system for performing face recognition.

FIG. 9 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 900 comprises one or more processors 902. The one or more processors control operation of other components of the system/apparatus 900. The one or more processors 902 may, for example, comprise a general purpose processor. The one or more processors 902 may be a single core device or a multiple core device. The one or more processors 902 may comprise a central processing unit (CPU) or a graphical processing unit (GPU). For example, 8 NVIDIA Tesla P40 (24 GB) GPUs. Alternatively, the one or more processors 902 may comprise specialized processing hardware, for instance a RISC processor or programmable hardware with embedded firmware. Multiple processors may be included.

The system/apparatus comprises a working or volatile memory 904. The one or more processors may access the volatile memory 904 in order to process data and may control the storage of data in memory. The volatile memory 904 may comprise RAM of any type, for example Static RAM (SRAM), Dynamic RAM (DRAM), or it may comprise Flash memory, such as an SD-Card.

The system/apparatus comprises a non-volatile memory 906. The non-volatile memory 906 stores a set of operation instructions 908 for controlling the operation of the processors 902 in the form of computer readable instructions. The non-volatile memory 906 may be a memory of any kind such as a Read Only Memory (ROM), a Flash memory or a magnetic drive memory.

The one or more processors 902 are configured to execute operating instructions 908 to cause the system/apparatus to perform any of the methods described herein. The operating instructions 908 may comprise code (i.e. drivers) relating to the hardware components of the system/apparatus 900, as well as code relating to the basic operation of the system/apparatus 900. Generally speaking, the one or more processors 902 execute one or more instructions of the operating instructions 908, which are stored permanently or semi-permanently in the non-volatile memory 906, using the volatile memory 904 to temporarily store data generated during execution of said operating instructions 908.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 8, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Although certain examples have described the sample as being a face image, the present invention is not limited to this embodiment. The above described methods may be used to train a neural network to classify any kind of data. Also, although certain examples have described the class as corresponding to the identity of an individual, the present invention is not limited to this embodiment. The class may correspond to any classification condition.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

What is claimed is:

1. A method of training a neural network for classifying an image into one of a plurality of classes, wherein the method is applied to a computer device comprising at least one processor, and the method comprises:
   extracting, from the neural network, a plurality of subclass center vectors for each class;
   inputting an image into the neural network, wherein the image is associated with a predetermined class;
   generating, using the neural network, an embedding vector corresponding to the input image;
   determining a similarity score between the embedding vector and each of the plurality of subclass center vectors;
   updating parameters of the neural network based on a plurality of the similarity scores using an objective function;
   extracting a plurality of updated parameters from the neural network;
   updating each subclass center vector based on the extracted updated parameters; and
   determining a closest subclass center vector for each class using the similarity scores,
   wherein the objective function comprises a multi-center loss term comparing the similarity score between the embedding vector and the closest subclass center vector from the predetermined class to the similarity scores between the embedding vector and the closest subclass center vectors from each of the other classes.

2. The method of claim 1, further comprising: prior to updating the parameters of the neural network:
   inputting a further image into the neural network, wherein the further image is associated with a predetermined class;
   generating, using the neural network, a further embedding vector corresponding to the further input image;
   determining a further similarity score between the further embedding vector and each of the plurality of subclass center vectors;
   wherein updating the parameters of the neural network is further based on the further similarity scores.

3. The method of claim 1, wherein the multi-center loss term is a margin-based softmax loss function.

4. The method of claim 1, wherein the embedding vector and each subclass center vector are normalized, and wherein the similarity score is an angle between the embedding vector and one of the subclass center vectors.

5. The method of claim 1, wherein each class comprises a dominant subclass, and the method further comprises:
   for each class, determining an intra-class similarity score between a dominant subclass center vector and each of the other subclass center vectors in the class,
   wherein the objective function comprises an intra-class compactness term that uses the intra-class similarity scores.

6. The method of claim 5, wherein each subclass center vector is normalized, and the intra-class similarity score is an angle between the dominant subclass center vector and another subclass center vector in the class.

7. The method of claim 1, wherein the neural network comprises a plurality of connected layers, and wherein each subclass center vector is updated using updated parameters extracted from a last fully connected layer of the neural network.

8. The method of claim 1, wherein each class comprises a dominant subclass, and the method further comprises:
   discarding a non-dominant subclass from a class based on the subclass center vector of the non-dominant subclass being above a threshold distance from the dominant subclass center vector of the class.

9. The method of claim 8, wherein the discarding the non-dominant subclass from the class is performed based on a threshold condition being satisfied.

10. The method of claim 9, wherein the threshold condition is a first threshold number of training epochs being exceeded.

11. The method of claim 1, further comprising:
    discarding all non-dominant subclasses based on a further threshold condition being satisfied.

12. The method of claim 11, wherein the further threshold condition is a second threshold number of training epochs being exceeded.

13. The method of claim 1, wherein the image is a face image.

14. The method of claim 1, wherein the class corresponds to a classification condition of the image, and
    wherein the image is from a batch that contains label noise such that the batch comprises at least one image labelled to relate to a class that does not correspond to the classification condition of the at least one image.

15. An apparatus comprising:
    one or more processors; and
    a memory, the memory comprising computer readable instructions that are executed by the one or more processors, and cause the apparatus to perform a method of training a neural network for classifying an image into one of a plurality of classes, the method including:
    extracting, from the neural network, a plurality of subclass center vectors for each class;
    inputting an image into the neural network, wherein the image is associated with a predetermined class;

generating, using the neural network, an embedding vector corresponding to the input image;
determining a similarity score between the embedding vector and each of the plurality of subclass center vectors;
updating parameters of the neural network based on a plurality of the similarity scores using an objective function;
extracting a plurality of updated parameters from the neural network;
updating each subclass center vector based on the extracted updated parameters; and
determining a closest subclass center vector for each class using the similarity scores,
wherein the objective function comprises a multi-center loss term comparing the similarity score between the embedding vector and the closest subclass center vector from the predetermined class to the similarity scores between the embedding vector and the closest subclass center vectors from each of the other classes.

16. A non-transitory computer-readable medium comprising computer readable instructions that are executed by a processor of a computing device, and cause the computing device to perform a method of training a neural network for classifying an image into one of a plurality of classes, the method including:
extracting, from the neural network, a plurality of subclass center vectors for each class;
inputting an image into the neural network, wherein the image is associated with a predetermined class;
generating, using the neural network, an embedding vector corresponding to the input image;
determining a similarity score between the embedding vector and each of the plurality of subclass center vectors;
updating parameters of the neural network based on a plurality of the similarity scores using an objective function;
extracting a plurality of updated parameters from the neural network;
updating each subclass center vector based on the extracted updated parameters; and
determining a closest subclass center vector for each class using the similarity scores,
wherein the objective function comprises a multi-center loss term comparing the similarity score between the embedding vector and the closest subclass center vector from the predetermined class to the similarity scores between the embedding vector and the closest subclass center vectors from each of the other classes.

17. The apparatus of claim 15, wherein the method further comprises: prior to updating the parameters of the neural network,
inputting a further image into the neural network, wherein the further image is associated with a predetermined class;
generating, using the neural network, a further embedding vector corresponding to the further input image;
determining a further similarity score between the further embedding vector and each of the plurality of subclass center vectors;
wherein updating the parameters of the neural network is further based on the further similarity scores.

18. The non-transitory computer-readable medium of claim 16, wherein the method further comprises: prior to updating the parameters of the neural network,
inputting a further image into the neural network, wherein the further image is associated with a predetermined class;
generating, using the neural network, a further embedding vector corresponding to the further input image;
determining a further similarity score between the further embedding vector and each of the plurality of subclass center vectors;
wherein updating the parameters of the neural network is further based on the further similarity scores.

19. The apparatus of claim 15, wherein the multi-center loss term is a margin-based softmax loss function.

20. The non-transitory computer-readable medium of claim 16, wherein the multi-center loss term is a margin-based softmax loss function.

* * * * *